No. 732,349. PATENTED JUNE 30, 1903.
G. C. HAWKINS.
ELECTRIC HEATER.
APPLICATION FILED AUG. 15, 1901.
NO MODEL. 3 SHEETS—SHEET 1.
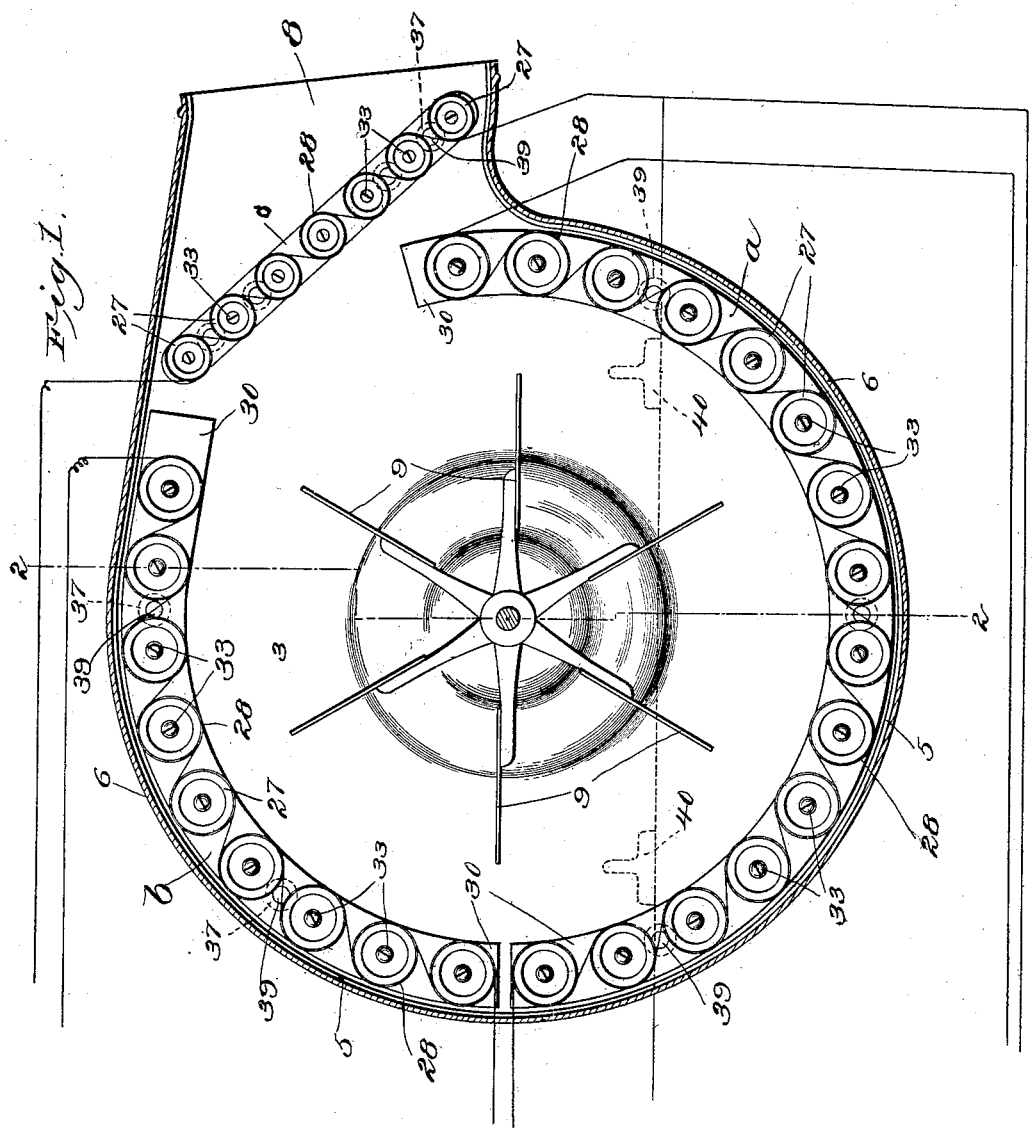

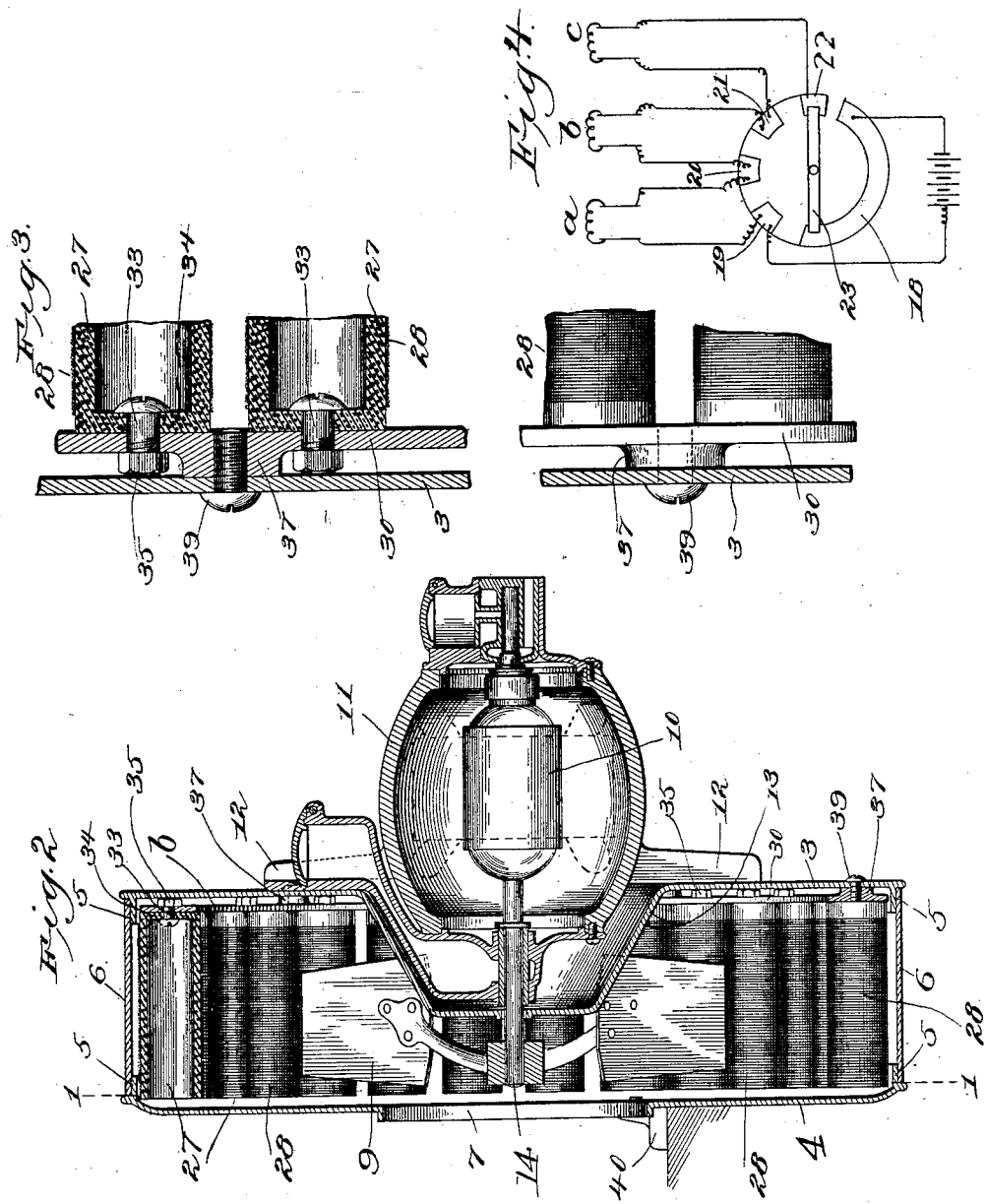

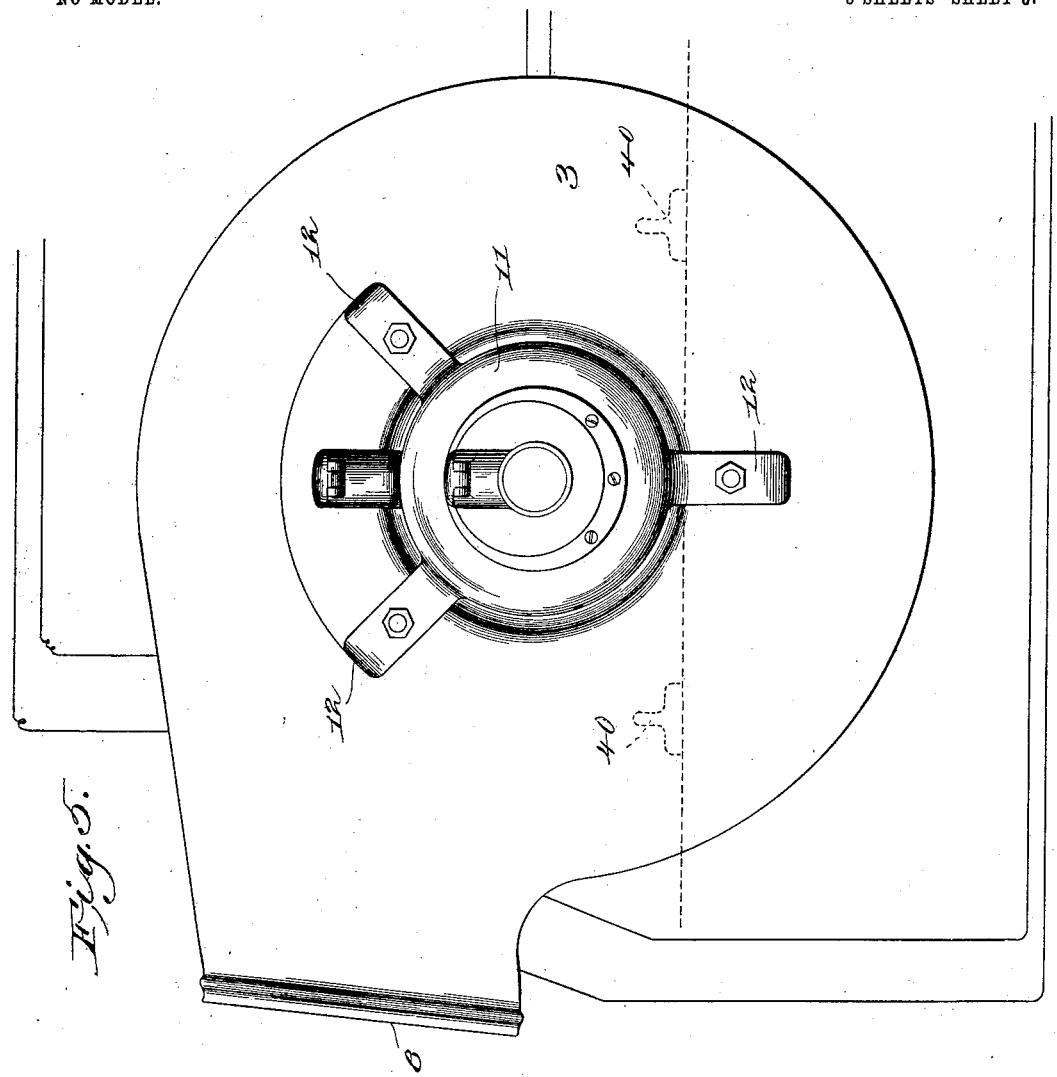

No. 732,349. Patented June 30, 1903.

UNITED STATES PATENT OFFICE.

GARDNER C. HAWKINS, OF BOSTON, MASSACHUSETTS.

ELECTRIC HEATER.

SPECIFICATION forming part of Letters Patent No. 732,349, dated June 30, 1903.

Application filed August 15, 1901. Serial No. 72,089. (No model.)

*To all whom it may concern:*

Be it known that I, GARDNER C. HAWKINS, a citizen of the United States, and a resident of Boston, county of Suffolk, State of Massachusetts, have invented an Improvement in Electric Heaters, of which the following description, in connection with the accompanying drawings, is a specification, like characters on the drawings representing like parts.

This invention relates to an electric heater comprising a fan-casing having inlet and discharge openings and in which is supported in some suitable way a series of resistance-coils through which a current of electricity is adapted to pass. Secured to the fan-casing is a motor-casing in which is mounted an electric motor, the shaft of the motor passing through the motor-casing into the fan-casing and having supported thereon a fan which is adapted to draw a current of air through the inlet-opening of the casing and force the same out after being heated by the resistance-coils through the discharge-openings. The resistance-coils are secured to the casing in a peculiar way, so as to provide an air-space between the same and the casing, whereby the heat generated is prevented from injuring or overheating the fan-casing.

Figure 1 is a section of my fan-casing, showing the fan and the resistance-coils therein, the section being taken on the line 1 1, Fig. 2. Fig. 2 is a section of the fan and motor casing on the line 2 2, Fig. 1. Fig. 3 is an enlarged detail showing the manner of securing the resistance-coils to the fan-casing, the said figure being broken out in the central portion, so as to show both lugs on the end of one carrier-plate. Fig. 4 shows diagrammatically a suitable switch for throwing in or out of the circuit the resistance-coils; and Fig. 5 is an end elevation of the apparatus looking from left to right, Fig. 2.

The form of fan-casing I prefer to use is circular, it having the two circular side plates 3 and 4, respectively, each provided on its periphery with the inturned flange 5, to which flange is secured in any suitable way the surrounding plate 6.

The side plate 4 of the fan-casing is provided with the inlet-opening 7, situated, preferably, centrally of the casing, and the said casing is provided with the tangential discharge-opening 8.

The fan-casing incloses a suitable fan 9, which is adapted to draw air through the inlet-opening 7 and discharge the same through the discharge-opening 8, the air in passing from the inlet-opening to the discharge-opening coming in contact with and being heated by a series of resistance-coils, hereinafter described.

In this embodiment of my invention the fan is operated by an electric motor, (designated generally by 10,) which motor is mounted in a casing 11 of any approved construction, the said motor-casing being secured to the side plate 3 of the fan-casing in any suitable way, as by making the motor-casing with the arms 12, which may be bolted or otherwise secured to the side plate 3. Preferably the side plate 3 is provided with the centrally-recessed portion 13, which receives one end of the motor-casing, and the shaft 14 of the motor will project through the motor-casing into the fan-casing and have the fan 9 secured thereto. The resistance-coils which heat the air are placed inside the fan-casing surrounding the fan, as shown in Fig. 1, and preferably I will assemble said resistance-coils in series and provide a plurality of such series whereby one or more series of the coils may be thrown into the circuit, depending upon the amount of heat desired.

In this embodiment of my invention I have shown three series of resistance-coils, one series $a$ being situated beneath the fan in Fig. 1, a second series $b$ being situated above the fan, and a third series $c$ being situated in the discharge-opening 8. The resistance-coils of each series are connected in series, and a suitable switch device (shown diagrammatically in Fig. 4) is employed to throw one or more of the series into the circuit, as desired.

The form of switch shown in Fig. 4 comprises the contact-plate 18, connected to one of the line-wires and the contact-plates 19, 20, 21, and 22, which are connected with the series of coils $a$, $b$, and $c$, respectively, the coils $a$ being connected to the contact-plates 19 and 20, the coils $b$ being connected to contact-plates 20 and 21, and the coils $c$ with the contact-plates 21 22, and the other line-wire being connected to contact-plate 19. A pivoted switch-point 23 is adapted to make contact between any one of the contact-plates 19, 20, 21, and 22 and the contact-plate 18, and by turning the switch-point 23 one or more of the series of coils may be thrown into circuit, as desired. The form of resistance-coil shown comprises a hollow tubular core 27, on which is wound the wire 28, forming the resistance, the said core preferably being of some suitable insulating material, such as porcelain. All of the coils of any one series are carried by a suitable carrier-plate, and the said plate is secured to one of the side plates of the fan-casing in such a way as to provide an air-space between the carrier-plate and the fan-casing, whereby the heat generated by the coils is prevented from injuring or overheating the casing.

As shown in Fig. 1, the carrier-plates 30 are curved to fit the interior of the casing, and each plate has secured to one side thereof, which is preferably a plane surface, the coils of the series, preferably by means of the bolts or screws 33, which pass through the apertured head 34 of the core and the carrier-plate, as seen in Fig. 3, a securing-nut 35 being preferably employed to prevent the screw 33 from becoming loosened. The opposite face of each carrier-plate is provided with one or more lugs or bosses 37, which rest against the inside of the side plate 3 of the fan-casing, and the said carrier-plates are secured to the fan-casing by means of screws 39, passed through the casing and into the lugs 37. These lugs 37 operate to space the plates 30 from the fan-casing, as will be evident from Fig. 3, whereby an air-space is formed through which a current of air is forced by the fan, thus preventing the resistance-coils from unduly heating the fan-casing, as would be the case if the coils were attached directly to the casing. The spacing-lugs 37 are of sufficient size to provide a space between the carrier-plate 30 and the side of the fan-casing sufficient to receive the nut 35 and the bolts or screws 33.

In securing the resistance-coils in place they are first fastened to the carrier-plates, as shown, and the carrier-plates are then secured to the fan-casing by means of the screws 39, which are screwed into the casing from the exterior. This provides a simple and expedient way of placing the coils in position or removing them from the casing.

From the above description it will be seen that the resistance-coils extend transversely of the casing that is parallel to the axis of the fan. The coils are also situated comparatively near together, and the series of coils extends entirely around the fan, the coils being situated close to the inner periphery of the casing. It follows from this construction that the air which is drawn in through the inlet-opening 7 by means of the fan will during its circuit of the casing be forced against the successive coils of all the series, and by virtue of the transverse arrangement of the coils the current of air will pass over the same transversely. I have found that this particular arrangement of coils surrounding the fan and extending transversely of the casing is highly advantageous, because the current of air in passing through the casing is subjected to the heating action of each one of the coils of all of the series, so that the heat delivered to any particle of air is the cumulated heat of all the coils. Each coil, therefore, augments the action of the preceding coils in giving to any particle of air the temperature which it has as it leaves the fan-casing.

I have especially designed the above-described electric heater for use in heating electric cars, although it will be obvious that it is capable of a quantity of uses, and when used to heat electric cars the fan-casing will be let into the floor of the car underneath the seat, and air will be drawn in from the exterior of the car, heated by the resistance-coils and forced out into the car by means of the fan. To support the heater, the casing is provided with the lugs 40, which are adapted to rest upon and be secured to the floor of the car.

Where the device is used for other purposes than heating electric cars, the lugs 40 may be secured to any suitable support.

Various changes may be made in such a device without departing from the spirit of the invention. I therefore reserve the right to make such changes as come within the scope of the appended claims.

Having fully described my invention, what I claim as new, and desire to secure by Letters Patent, is—

1. In an electric heater, a circular casing having a side inlet and a tangential outlet, a fan in the casing, means to rotate the fan, a carrier-plate secured to the side of the casing but spaced therefrom, a plurality of resistance-coils secured to said carrier-plate, said coils being arranged to form a row which substantially encircles the fan, each coil having its length transverse to the direction of the air-current in the casing, and a switch to control the number of coils in the circuit.

2. In an electric heater, a circular casing having a side inlet and tangential discharge, a fan in the casing, means to rotate the fan, a plurality of carrier-plates secured to the side of the casing, but spaced therefrom, a series of resistance-coils secured to each carrier-plate, said coils all having their length transverse to the direction of the air-current in the casing, and means to throw any number of the series in circuit.

3. In an electric heater, a circular casing having a side inlet and a tangential discharge, a fan in the casing, means to rotate the fan, a plurality of carrier-plates secured to the side of the casing, one face of each of said plates being plane and the other having spacing-lugs projecting therefrom, a series of resistance-coils carried by each plate, each coil being secured to its plate at one end only, and having its length transverse to the air-current in the casing, and screws passing through the side of the casing from the exterior and into the lugs of the plates, the said lugs operating to space the plates from the casing.

In testimony whereof I have signed my name to this specification in the presence of two subscribing witnesses.

GARDNER C. HAWKINS.

Witnesses:
WALLACE G. WEBBER,
FREDERICK L. EMERY.